(12) United States Patent
Kurosaki et al.

(10) Patent No.: US 7,907,114 B2
(45) Date of Patent: Mar. 15, 2011

(54) INDICATING LAMP CONTROL PROGRAM, INFORMATION PROCESSING APPARATUS, AND INDICATING LAMP CONTROL METHOD

(75) Inventors: Daisuke Kurosaki, Tokyo (JP); Hirotaka Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 867 days.

(21) Appl. No.: 11/733,428

(22) Filed: Apr. 10, 2007

(65) Prior Publication Data

US 2007/0236411 A1 Oct. 11, 2007

(30) Foreign Application Priority Data

Apr. 11, 2006 (JP) ................................. 2006-108312

(51) Int. Cl.
*G09G 3/36* (2006.01)
(52) U.S. Cl. ........................ 345/102; 345/30; 348/E5.12
(58) Field of Classification Search .................... 345/30, 345/102; 348/E5.12
See application file for complete search history.

(56) References Cited

U.S. PATENT DOCUMENTS 7,239,093 B2 * 7/2007 Hsieh ............................ 315/291
2006/0020900 A1 * 1/2006 Kumagai et al. ............... 715/767

FOREIGN PATENT DOCUMENTS

JP 5-276415 10/1993

* cited by examiner

*Primary Examiner* — Kevin M Nguyen
*Assistant Examiner* — Kenneth B Lee, Jr.
(74) *Attorney, Agent, or Firm* — Oblon, Spivak, McClelland, Maier & Neustadt, L.L.P.

(57) ABSTRACT

An indicating lamp control program adapted for a computer to perform processing for controlling an illuminating operation of indicating lamps disposed around a display surface of a display apparatus, includes as functions for the computer: window information acquiring means for acquiring information representing a back-to-forth position and a size of a window generated, with running of an application program; program determining means for determining whether or not the application program is a content display program adapted for the display apparatus to display the contents; and control means for providing control based on both of the information acquired by the window information acquiring means and a determination result obtained by the program determining means so as to turn down the indicating lamps less than a predetermined level when the window corresponding to the content display program is in a topmost position and has a predetermined size or more.

21 Claims, 8 Drawing Sheets

INDICATING LAMP CONTROL PROGRAM, INFORMATION PROCESSING APPARATUS, AND INDICATING LAMP CONTROL METHOD

BACKGROUND OF THE INVENTION

1. Field of the Invention

The present invention relates to an indicating lamp control program adapted for a computer to perform processing for controlling an illuminating operation of indicating lamps disposed around a display panel surface of a display apparatus, an information processing apparatus for executing the above processing, and an indicating lamp control method. More particularly, the present invention relates to an indicating lamp control program, an information processing apparatus and an indicating lamp control method that are all suitably applied to a case where display of video contents on the display apparatus is obtained.

2. Description of Related Art

In recent years, as a personal computer (hereinafter simply referred to as PC) for domestic use is widespread among the general public, a demand for enjoyment of video contents using the PC as a substitute for a usual television (hereinafter simply referred to as TV) apparatus and/or a special-purpose recorder apparatus is increasing. Thus, advance is made in development of the PC having an enhanced AV (Audio Visual) function. For instance, a latest model of the PC is frequently available in types that provide not only reproducing of video contents recorded in an optical disk etc., but also display of received broadcasting contents or recording of the broadcasting contents into a recording medium such as a HDD (Hard Disk Drive) using a TV tuner being equipped. An enhancement of monitor performances such as response speed and color reproducibility and an increase in monitor size are also in progress for more comfortable viewing of the video contents.

Further, the PC of this type having the enhanced AV function is frequently available in the form of a monitor-integrated PC in which a PC body unit containing a processor and a recording apparatus etc. is integrated with a monitor. Integration of the PC body unit with the monitor provides merits of less installation space for the PC and more laborsaving in interconnecting various apparatuses at the time of installation. There are also added merits that the monitor-integrated PC has a close resemblance to the usual TV apparatus in external shape, and thus hardly makes an incompatible impression when placed as the substitute for the TV apparatus.

By the way, the PC body unit usually has, on its external casing surface, various small-sized indicating lamps including a power lamp to indicate a power on/off state, and LEDs (Light Emitting Diodes) etc. However, the monitor-integrated PC inevitably involves an arrangement of the above various small-sized indicating lamps around an outer edge of the monitor. Thus, an issue exists in that during viewing of the video contents using the monitor-integrated PC, particularly, with a room darkened, light coming from the small-sized indicating lamps of this type into user's sight often causes an interference with user's comfortable viewing environment. Therefore, the PC of a type in which switching of a brightness of the small-sized indicating lamps is obtained by operating a hardware switch etc. by the user has been realized.

As the related art, it is to be noted that in relation to a camera used in a broadcasting studio etc., there is provided one technology adapted to surely obtain recognition of a tally lamp housed in a viewfinder without damage to visibility of a monitor display in such a manner as to, upon reception of a tally signal that specifies the camera as that in the process of being on the air, illuminate the tally lamp highlighted, followed by reducing a light quantity of the tally lamp to provide continuous illumination. See the following patent document.

Japanese Patent Application Publication No. Hei 5-276415 (paragraphs [0018] to [0020], and FIG. 3)

However, in the case of the monitor-integrated PC having a function for switching the brightness of the small-sized indicating lamps including the power lamp as described the above, it is necessary for the user to carry out a switching operation for turning down the small-sized indicating lamps while viewing the video contents, for instance, resulting in an issue of a need of a complicated operation. Particularly, the user usually takes one's position close to the PC during use of the PC through an operation of a keyboard and/or a mouse, whereas the user seems to be frequently at a distance from the PC, besides, often with the room darkened during viewing of the video contents with the PC. Thus, if this is the case, the user has encountered a difficulty in carrying out the switching operation for turning down the small-sized indicating lamps.

SUMMARY OF THE INVENTION

The present invention has been undertaken in view of the above issues, and is intended to provide an indicating lamp control program, an information processing apparatus and an indicating lamp control method that are all adaptable to satisfactorily maintain a content viewing environment by automatically controlling indicating lamps disposed around a display surface.

To solve the above issues, the present invention provides an indicating lamp control program adapted for a computer to perform processing for controlling an illuminating operation of indicating lamps disposed around a display surface of a display apparatus, the indicating lamp control program being characterized by providing functions for the computer as window information acquiring means for acquiring information representing a back-to-forth position and a size of a window generated, with running of an application program, in a display image obtained on the display apparatus; program determining means for determining whether or not the application program corresponding to the generated window is a content display program adapted for the display apparatus to display the contents; and control means for providing control based on both of the information acquired by the window information acquiring means and a determination result obtained by the program determining means so as to turn down the indicating lamps when the window corresponding to the content display program is in a topmost position with respect to the other windows in the display image obtained on the display apparatus and has a predetermined size or more, while turning up the indicating lamps in other cases.

When allowing the computer to run the indicating lamp control program of this type, the information representing the back-to-forth position and the size of the window is acquired by the window information acquiring means. It is to be noted that the window is supposed to be generated, with the running of the application program, in the display image obtained on the display apparatus. Also, it is determined by the program determining means whether or not the application program corresponding to the generated window is the content display program adapted for the display apparatus to display the contents. Then, the brightness of the indicating lamps is controlled by the control means based on both of the information acquired by the window information acquiring means and the determination result obtained by the program determining means. Specifically, there is provided the control so as to turn down the indicating lamps when the window corresponding to the content display program is in the topmost position with respect to the other windows in the display image obtained on the display apparatus and has the predetermined size or more, while turning up the indicating lamps in other cases.

According to the indicating lamp control program of the present invention, the control is obtained so as to turn down the indicating lamps when the window corresponding to the content display program is in the topmost position with respect to the other windows and has the predetermined size or more, while turning up the indicating lamps in other cases, so that the light from the indicating lamps may be prevented from coming into user's sight by automatically turning down the indicating lamps on an accurate presumption that the viewing of the contents is carried on by the user at the distance from the display apparatus. As a result, the user may obtain the viewing of the contents in a comfortable environment without any extra input operation.

BRIEF DESCRIPTION OF DRAWINGS

The features and advantages of the present invention will become more apparent in the following description of presently preferred embodiments of the invention taken in conjunction with the accompanying drawings, in which.

DESCRIPTION OF THE INVENTION

Figure 1:
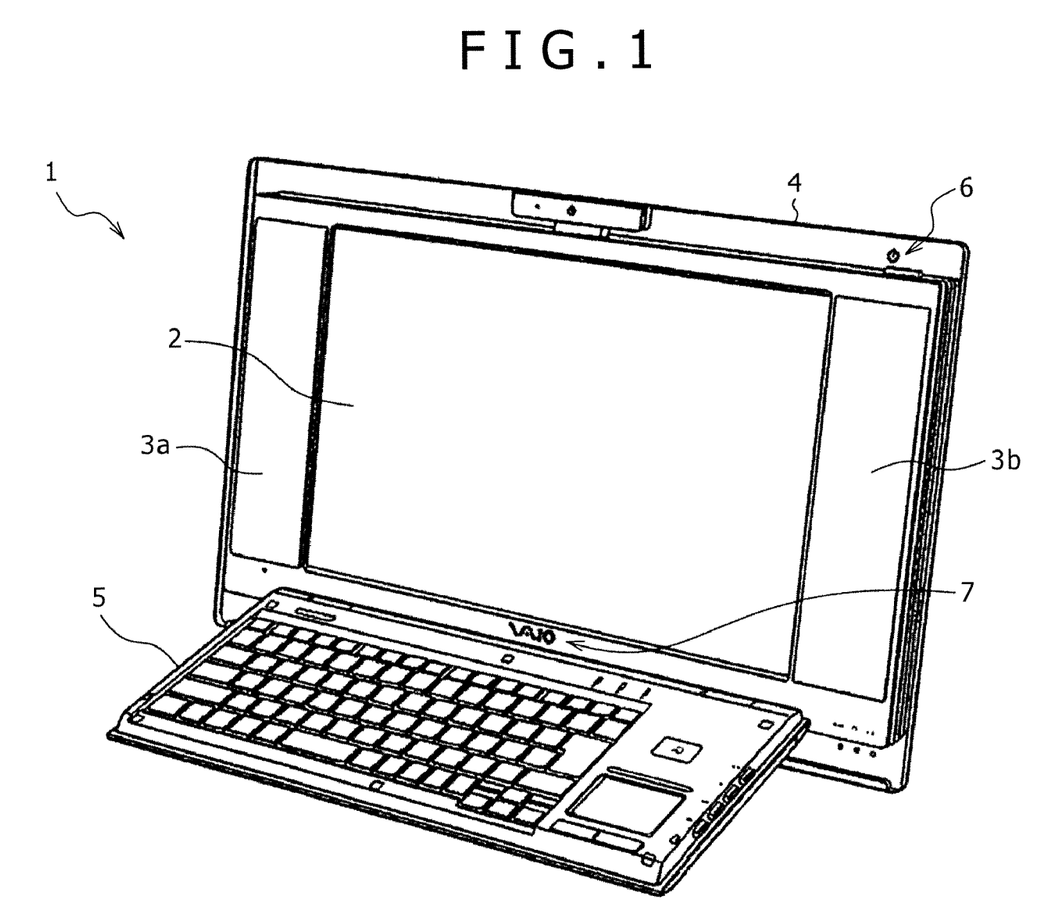
FIG. 1 is a perspective view showing an external appearance of an information processing apparatus according to one embodiment of the present invention.

FIG. 1 is a perspective view showing an external appearance of an information processing apparatus according to one embodiment of the present invention.

An information processing apparatus 1 shown in FIG. 1 is in the form of a so-called monitor-integrated PC in which a PC body unit (not shown) containing a processing device consisting of a processor etc. and a storage device such as an HDD is integrated with a monitor 2. The monitor 2 consists of an LCD (Liquid Crystal Display), and has, at its opposite sides, speakers 3a and 3b. And, there is integrally provided the PC body unit on a back surface of a casing 4 fixedly provided with the monitor 2 and the speakers 3a and 3b. Further, a keyboard 5 for operating the information processing apparatus 1 is connected to a lower section of a front surface of the casing 4. While one embodiment of the present invention has the keyboard 5 fixed to the casing 4, the keyboard 5 may be in a detachable form.

Further, the front surface of the casing 4 has a power indicating unit 6 and a logo indicating unit 7 around the monitor 2. Each of the power indicating unit 6 and the logo indicating unit 7 forms a small-sized indicating lamp involving use of the LED. The power indicating unit 6 provides illumination for a power mark when a power is on. The logo indicating unit 7 provides the illumination for a logo mark indicative of a model name etc. of the information processing apparatus 1 when the power is on (it is to be noted that "VAIO" in FIG. 1 shows a trademark of SONY CORPORATION).

Figure 2:
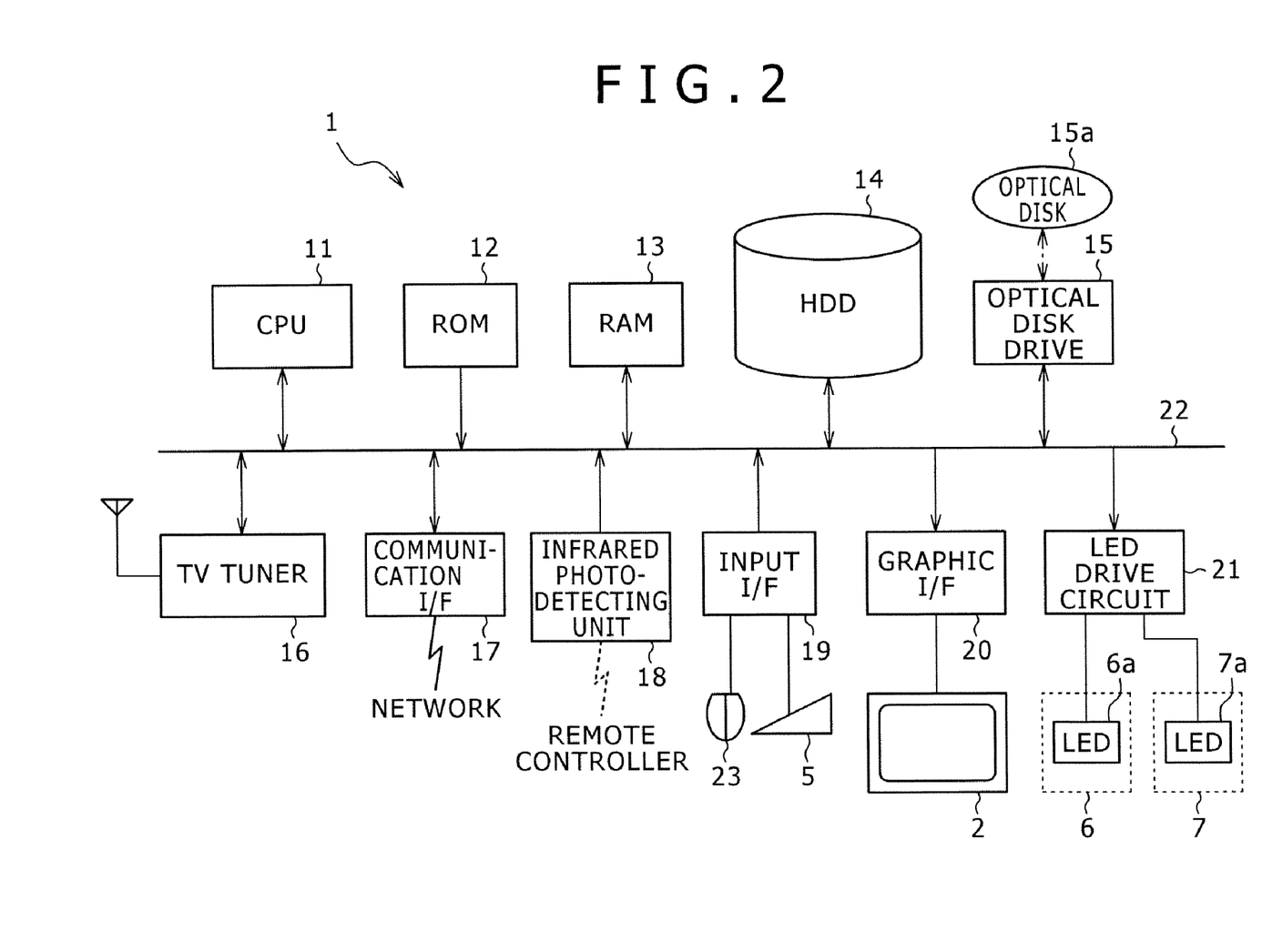
FIG. 2 is a block diagram showing a hardware configuration of the information processing apparatus.

FIG. 2 is a block diagram showing a hardware configuration of the information processing apparatus.

The information processing apparatus 1 is controlled in its entirety with a CPU (Central Processing Unit) 11. A ROM (Read Only Memory) 12, a RAM (Random Access Memory) 13, a HDD 14, an optical disk drive 15, a TV tuner 16, a communication interface 17, an infrared photo-detecting unit 18, an input interface 19, a graphics interface 20 and a LED drive circuit 21 are connected to the CPU 11 through an internal bus 22.

A program such as BIOS (Basic Input/output System) adapted for the CPU 11 to execute and data are contained in the ROM 12. Part of a program to be run on the CPU 11 and various data required for processing are temporarily stored in the RAM 13.

An OS (Operating System) program and various application programs are stored in the HDD 14. These types of application programs include a video content display program and an indicating lamp control program etc. as described later. Further, various types of data such as recorded video contents are also stored in the HDD 14.

The optical disk drive 15 effects reading of recorded data from an optical disk 15a and writing of data to the optical disk 15a under control of the CPU 11.

Upon reception of a broadcasting wave of a frequency specified by the CPU 11, the TV tuner 16 demodulates a TV signal from a received signal of the broadcasting wave, followed by outputting the demodulated TV signal in the form of digital data to the internal bus 22. Output data from the TV tuner 16 is supplied to the graphics interface 20 under control of the CPU 11, causing display of broadcasting contents on the monitor 2 to be obtained. When a received signal is an analog TV signal, it will be appreciated that a demodulated video signal may be outputted to the graphics interface 20 in the form of an analog signal without conversion. Further, the output data from the TV tuner 16 may be also recorded as the video contents in the HDD 14 and the optical disk 15a.

The communication interface 17 is connected to a network to transmit and receive data to and from the other apparatus through the network. The infrared photo-detecting unit 18 detects an infrared signal outputted from a remote controller required for the user to operate the information processing apparatus 1, followed by outputting control data suited for the detected signal to the CPU 11.

The keyboard 5 and a mouse 23 are connected to the input interface 19. The input interface 19 transmits, to the CPU 11 through the internal bus 22, signals supplied from the keyboard 5 and the mouse 23. The monitor 2 is connected to the graphics interface 20. The graphics interface 20 causes an image to be displayed on the monitor 2 under control of the CPU 11.

A LED 6a for illuminating the power mark of the power indicating unit 6 and a LED 7a for illuminating the logo mark of the logo indicating unit 7 are connected to the LED drive circuit 21. The LED drive circuit 21 supplies, under control of the CPU 11, a drive voltage to the LEDs 6a and 7a for on/off and brightness control of these LEDs.

Although not shown, it is to be noted that the information processing apparatus 1 has other units such as an interface unit, an amplifier and a speaker for audio output. The hardware configuration as described the above provides implementation of processing functions in one embodiment of the present invention.

Indicating lamp control in the information processing apparatus 1 according to one embodiment of the present invention is now described.

As shown in FIG. 1, the information processing apparatus 1 has, around the monitor 2, the power indicating unit 6 and the logo indicating unit 7 respectively illuminated with the LEDs 6a and 7a. Thus, while the viewing of the video contents is carried on by the user through the monitor 2, light coming from these indicating lamps into user's sight may cause an interference with the viewing. Particularly, viewing the video contents with a room darkened seems to make a more uncomfortable impression upon the user.

Accordingly, the information processing apparatus 1 according to one embodiment of the present invention conducts a presumption of a situation of the interference caused by the light emitted from the power indicating unit 6 and the logo indicating unit 7 as described the above at the time of display of a video image, followed by providing automatic brightness and on/off switching of each indicating unit depending on a result of the presumption. Specifically, according to one embodiment of the present invention, the above presumption is supposed to take place based on a position (or a back-to-forth position facing the display) and a size of the video content display window on the display.

Figure 3:
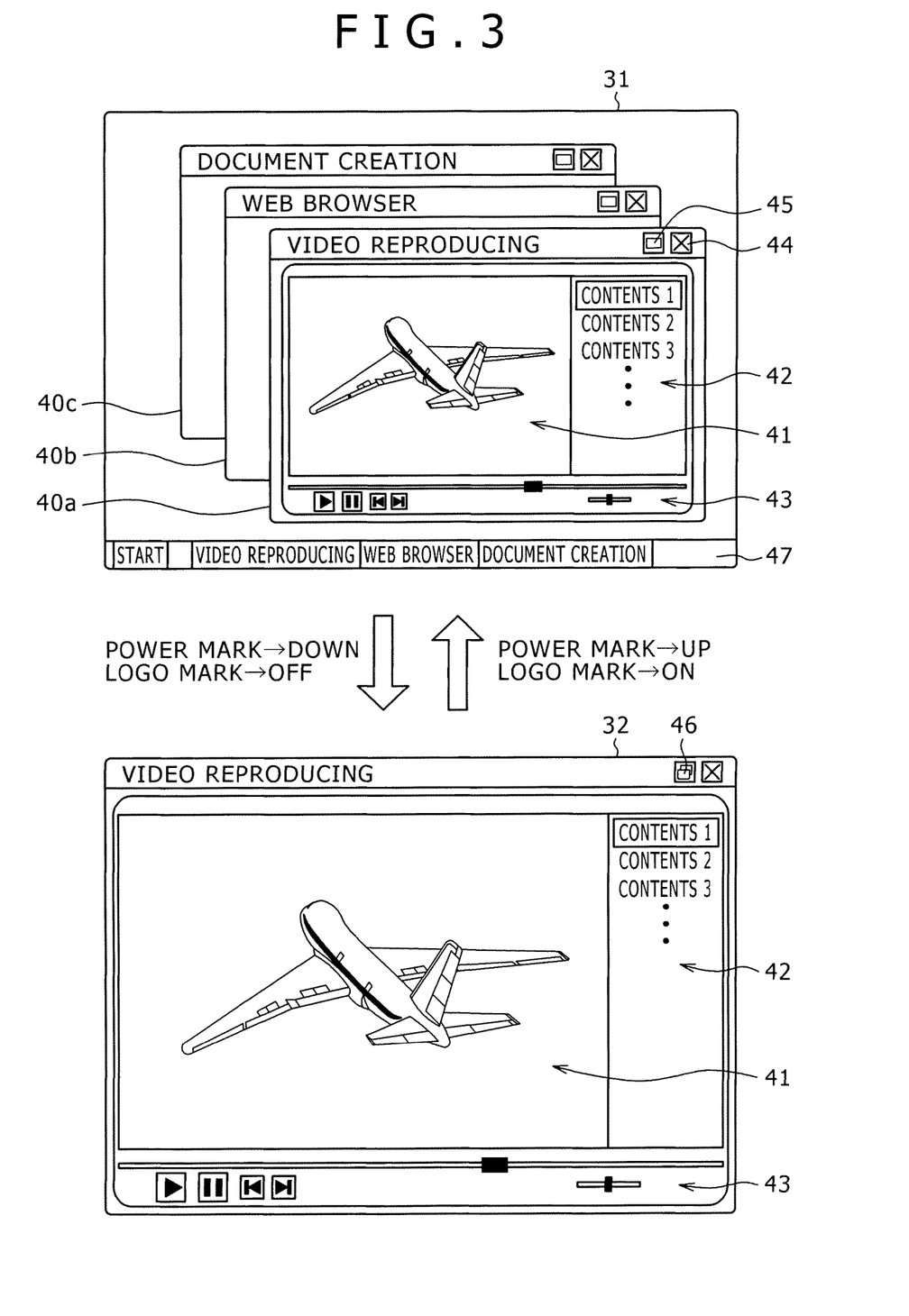
FIG. 3 illustrates one display transition for explaining indicating lamp control depending on a position and a size of a window.

FIG. 3 illustrates one display transition for explaining the indicating lamp control depending on the position and the size of the window.

There is illustrated a stack of three windows 40a to 40c on a display 31 shown in a top part of FIG. 3. The window 40a is specified as that obtained with running of a video reproducing program. The window 40b is specified as that obtained with running of a Web page display program (or a Web browser). The window 40c is specified as that obtained with running of a document creating program. The windows 40a, 40b and 40c on the display 31 are sized smaller than a full screen of the display 31.

Further, the windows 40a, 40b and 40c on the display 31 are stacked in this order from the front side of the display, and various operational inputs with the keyboard 5 and the mouse 23 are acceptable only to the topmost window 40a among the windows 40a to 40c.

The window 40a corresponding to the video reproducing program has an interior mainly composed of an image display area 41 on which a reproduced image of the video contents is displayed, a content display/selection area 42 effective in providing display and selection of a file and a track chapter of the video contents, and an operation area 43 used for setting of a reproducing operation such as playback, stop and volume control.

Further, an end button 44 and a move-to-full screen display button 45 are on an upper right of the window 40a. A click of the end button 44 in alignment with a mouse pointer (not shown) may terminate the running of the video reproducing program. The click of the move-to-full screen display button 45 may expand the window 40a to fill the whole display area of the monitor 2, like a display 32.

The display 32 shown in a bottom part of FIG. 3 is specified as that obtained after bringing the window 40a to full screen display, and has the interior composed of the image display area 41, the content display/selection area 42 and the operation area 43, like the window 40a. However, the image display area 41 of the display 32 is particularly provided in a largely expanded form. A move-to-reduced display button 46 is on the upper right of the display 32. The click of the move-to-reduced display button 46 may restore the display 32 to the same state as the display 31 by reducing a display area of the window corresponding to the video reproducing program.

Instead of the click of the move-to-full screen display button 45 and the move-to-reduced display button 46 on the above display, it will be appreciated that any type of methods such as of giving operational input to the remote controller may be also applied to provide the full screen display of the window and restoration of the window from the full screen display.

Now, in the case of the display like the display 31 with the window sized smaller than the full screen of the display or more than one small window stacked, it may well be that the user is at watching of the display 31 while operating the keyboard 5 and the mouse 23 disposed around the information processing apparatus 1. Further, in a state as in the case of the display 31, even if the window corresponding to the video display program is in a topmost position, the user watching the topmost window frequently seems to take one's position close to the monitor 2.

Conversely, in the case of the display like the display 32 obtained after bringing the video content display window to the full screen display, it may well be that the user is making use of the information processing apparatus 1 only for the purpose of viewing the video contents. In the state as in the case of the display 32, the user also highly seems to carry on with the viewing at a distance from the monitor 2, as compared with the case where the user has the operation of keyboard 5 and the mouse 32.

The interference by the light from the power indicating unit 6 and the logo indicating unit 7 during watching of the monitor 2 mainly occurs when the video contents are watched with the room darkened, in which case, the user frequently seems to carry on with the viewing at the distance from the monitor 2. Conversely, while the user has the operation of the keyboard 5 and the mouse 23, a circumference of the monitor 2 frequently seems to be made brighter, in which case, an incompatible impression against the light from the power indicating unit 6 and the logo indicating unit 7 hardly happens to the user.

Accordingly, one embodiment of the present invention conducts, based on the back-to-forth position and the size of the window in execution of displaying the video contents, the presumption whether or not the viewing of the video contents is carried on by the user at the distance from the monitor 2 during display of the video contents, followed by providing the automatic brightness and on/off control of the indicating lamps depending on the result of the presumption. Specifically, when the window corresponding to the video content display program is in the topmost position and on the full screen display, the LED 6a of the power indicating unit 6 is turned down to an intensity lower than its usual brightness, and the LED 7a of the logo indicating unit 7 is turned off. Thus, according to one instance in FIG. 3, when a transition from the state of the display 31 to that of the display 32 occurs, the power mark is made dim, and the logo mark goes out. On the other hand, in the case of the restoration of the display 32 to the state of the display 31, the power mark is made brighter, and the logo mark goes on.

It is to be noted that there is provided a task bar 47 on a bottom part of the display 31 in FIG. 3. Program names corresponding to a presently generated window are on the task bar 47, and the click of the program name may bring the corresponding window to the top. When the full screen display of the specific window is obtained, like the display 32, it is also allowable to place the task bar 47 on the bottom part. In this case, with the window corresponding to the video display program on the full screen display, the click of the other program name in the task bar 47 causes the window corresponding to the resultant program to be stacked on the reproduced image of the video contents. Thus, even if this is the case, the window corresponding to the video display program is brought to a position other than the topmost, so that there is given the control so as to return the power mark to its normal brightness, and re-illuminate the logo mark.

Figure 4:
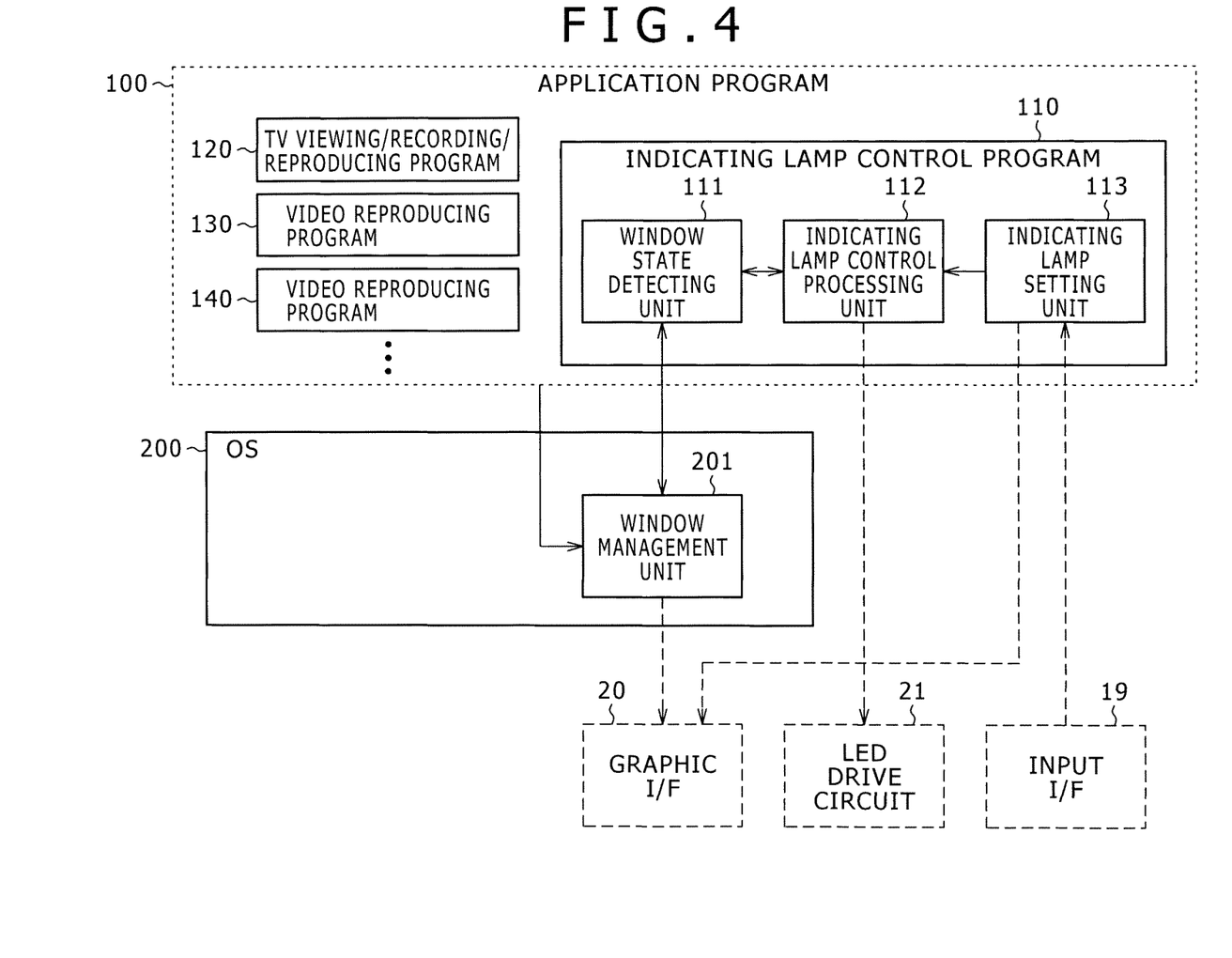
FIG. 4 is a block diagram showing functions contained in the information processing apparatus to implement the indicating lamp control.

FIG. 4 is a block diagram showing functions contained in the information processing apparatus to implement the indicating lamp control.

The information processing apparatus 1 has a window state detecting unit 111, an indicating lamp control processing unit 112, an indicating lamp setting unit 113, and a window management unit 201 as functions for implementation of the above indicating lamp control. Hereupon, the functions of the window state detecting unit 111, the indicating lamp control processing unit 112 and the indicating lamp setting unit 113 are respectively implemented by allowing the CPU 11 to run the indicating lamp control program 110 specified as one of the application programs 100 to be run on the OS 200. The window management unit 201 is implemented as a function of the OS 200.

It is to be noted that installation of the application programs 100 including a TV viewing/recording-reproducing program 120 and video reproducing programs 130 and 140 as well as the indicating lamp control program 110 is provided for the information processing apparatus 1. The TV viewing/recording-reproducing program 120 is to implement operations including reception and display of broadcasting contents (or the video contents) with the TV tuner 16, recording of the received broadcasting contents into the HDD 14 or the optical disk 15*a*, and reproducing of the recorded broadcasting contents. Running the TV viewing/recording-reproducing program may bring the information processing apparatus 1 into operation like the usual type of TV apparatus and video recorder.

The video reproducing programs 130 and 140 are both to implement the reproducing of the recorded video contents in the recording medium such as the HDD 14 and the optical disk 15*a* and/or the streaming-delivered video contents from an external apparatus through the network. In this manner, the information processing apparatus 1 is packaged with more than one program adaptable to provide the display of the video contents.

In response to a request from the indicating lamp control processing unit 112, the window state detecting unit 111 acquires, from the window management unit 201, information including window state information such as the position and the size of the window on the monitor 2 and corresponding program identification information, followed by outputting the acquired information to the indicating lamp control processing unit 112. While one embodiment of the present invention employs the program name as the program identification information, it will be appreciated that other information such as an identification number for providing program identification is also available.

The indicating lamp control processing unit 112 provides the brightness control for the LED 6*a* of the power indicating unit 6 and the on/off control for the LED 7*a* of the logo indicating unit 7 based on the information from the window state detecting unit 111. It is to be noted that the indicating lamp control processing unit 112 effects the above control of the illuminating operation in practice by issuing a control signal to the BIOS adapted to control driving of each of the LEDs 6*a* and 7*a* through the LED drive circuit 21.

The indicating lamp setting unit 113 creates, in the indicating lamp control processing unit 112, an entry of program names specified as applications for the indicating lamp control, and gives on/off setting of the processing functions thereto. The indicating lamp setting unit 113 generates image information of a setting display for acceptance of this type of entry and setting from the user, and causes the monitor 2 to display the generated image information through the graphics interface 20, followed by accepting the control signal depending on a user's operation through the input interface 19.

The window management unit 201 manages the state of the window on the monitor 2. Specifically, when some window is opened on the display, the window management unit 201 generates a window ID corresponding to the on-display window, and holds information such as the back-to-forth position and the size of the window for each window ID. Further, the name of the in-execution program corresponding to each window (or a name of an executable file of the above program, for instance) is also held.

One display of the setting display generated by the indicating lamp setting unit 113 is now described with reference to FIGS. 5 and 6. The indicating lamp setting unit 113 is effective in setting the brightness or on/off control individually for each of the power indicating unit 6 and the logo indicating unit 7.

Figure 5:
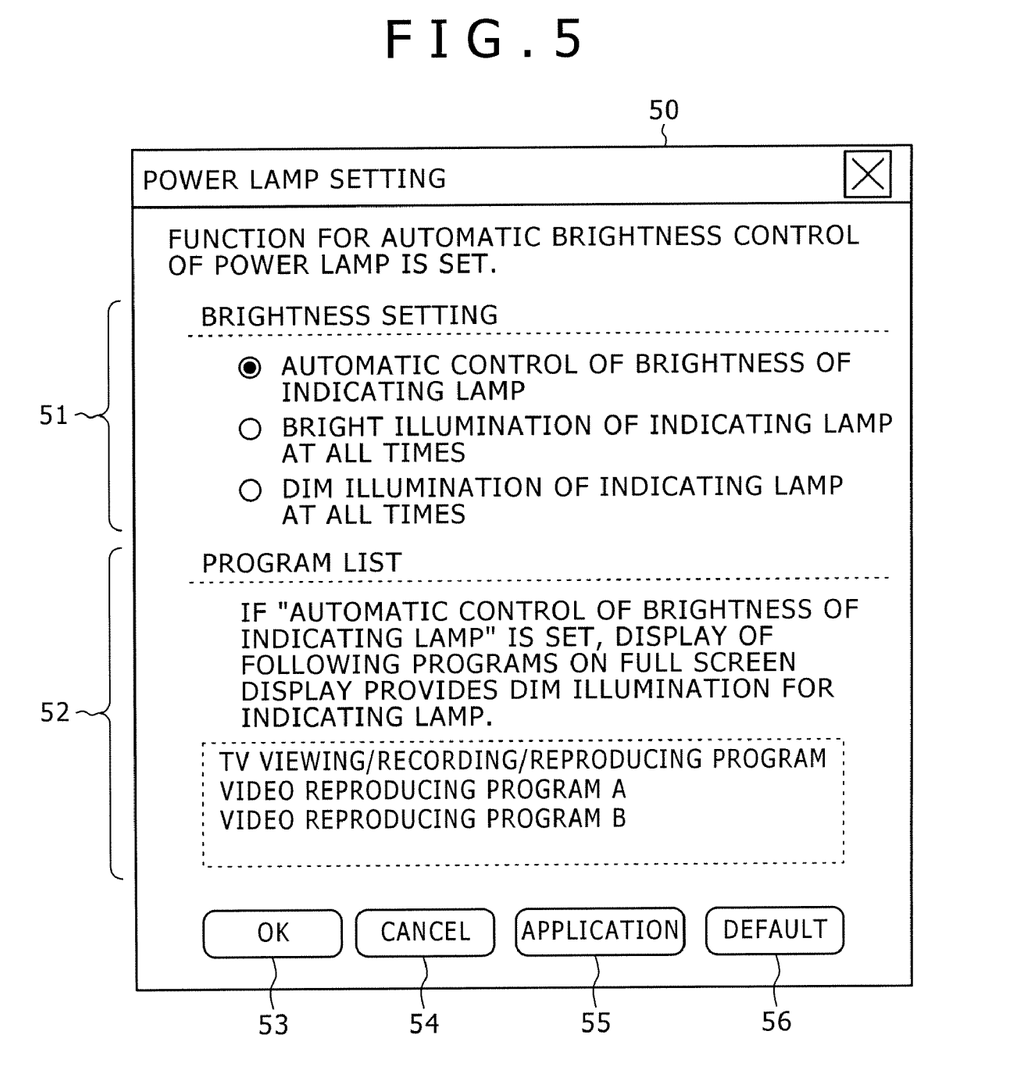
FIG. 5 is a view showing one display of a setting display for a power indicating unit.

FIG. 5 is a view showing one display of the setting display for the power indicating unit.

The indicating lamp setting unit 113 generates a setting display 50 as shown in FIG. 5 for various settings for the LED 6*a* of the power indicating unit 6. The generated setting display 50 is composed of a brightness setting area 51 for setting of brightness control requirements for the LED 6*a*, and a program list display area 52 on which the program names specified as the applications for the control are listed.

There are illustrated three requirements on the brightness setting area 51, and the click of one of three radio buttons respectively corresponding to the three requirements allows the selected requirement to be applied. In this case, putting a check mark on one requirement saying that "AUTOMATIC CONTROL FOR BRIGHTNESS OF INDICATING LAMP" may give to the indicating lamp control processing unit 112 the setting for the automatic control of the LED 6*a* based on the above result of the presumption on the user's position. Alternatively, it is also allowable to obtain bright or dim illumination of the LED 6*a* at all times without the above automatic control.

The names of programs applicable for the automatic brightness control of the power indicating unit 6 are listed on the program list display area 52. The program names on this area are listed with the indicating lamp control processing unit 112, and when the window corresponding to each of these programs is in the topmost position and on the full screen display, the brightness of the power indicating unit 6 is controlled. Further, it is also allowable to give more programs to the applications for the control by creating the entry of a new program name in the indicating lamp control processing unit 112 in such a manner as to, after selection of a different program by the user through the input operation, add a selected program name to the program list display area 52.

It will be appreciated that instead of the program name, an icon image effective in providing a program identification may be displayed on the program list display area 52, or alternatively, both of the program name and the icon image are also available. In other words, the display of the listed programs in an identifiable manner is only needed.

Further, an OK button 53 is an input button to close the setting display 50 after settlement of inputted setting information. A cancel button 54 is an input button to close the setting display 50 without applying the inputted setting information. An application button 55 is an input button to apply the inputted setting information to the indicating lamp control processing unit 112. A default button 56 is an input button to initialize the setting information applied to the indicating lamp control processing unit 112.

Figure 6:
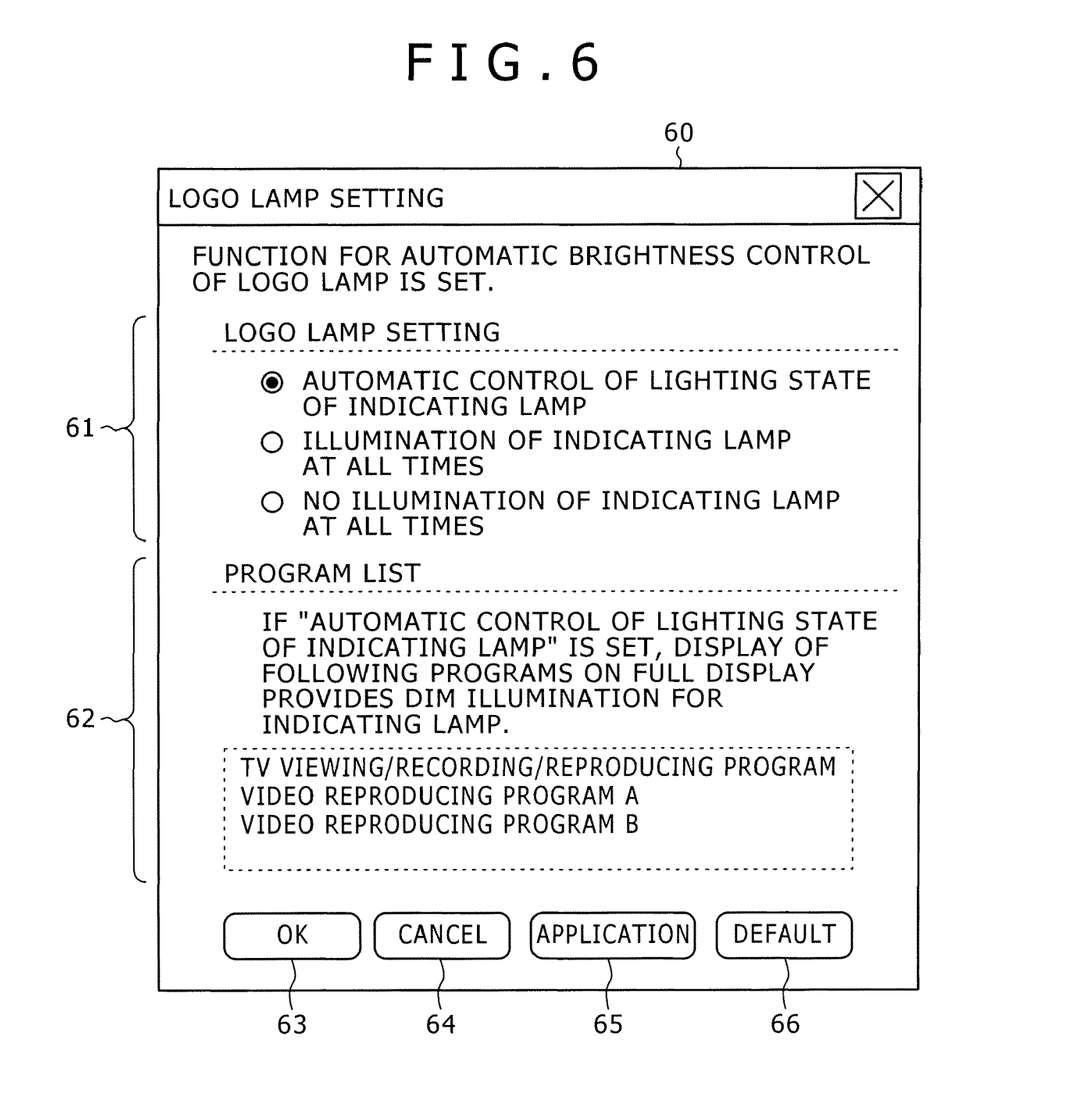
FIG. 6 is a view showing one display of a setting display for a logo indicating unit.

FIG. 6 is a view showing one display of the setting display for the logo indicating unit.

The indicating lamp setting unit 113 generates a setting display 60 as shown in FIG. 6 for various settings for the LED 7a of the logo indicating unit 7. The setting display 60 is composed of an on/off setting area 61 for setting of on/off control requirements for the LED 7a and a program list display area 62 on which the program names specified as the applications for the control are listed.

The on/off setting area 61 has three radio buttons, for instance, and the click of one of the three radio buttons may give the setting for the automatic on/off control of the LED 7a based on the above result of the presumption on the user's position, or for the illumination or no illumination of the LED 7a at all times.

Like the program list display area 52 in FIG. 5, the names of programs applicable for the automatic on/off control of the LED 7a are listed on the program list display area 62. Further, it is also allowable to give more programs to the applications for the control by adding a new program name to the program list display area 62.

It is to be noted that an OK button 63, a cancel button 64, an application button 65 and a default button 66 are the same in function as the OK button 53, the cancel button 54, the application button 55 and the default button 56. Then, the inputted information in the setting display 60 is applied to the indicating lamp control processing unit 112.

Figure 7:
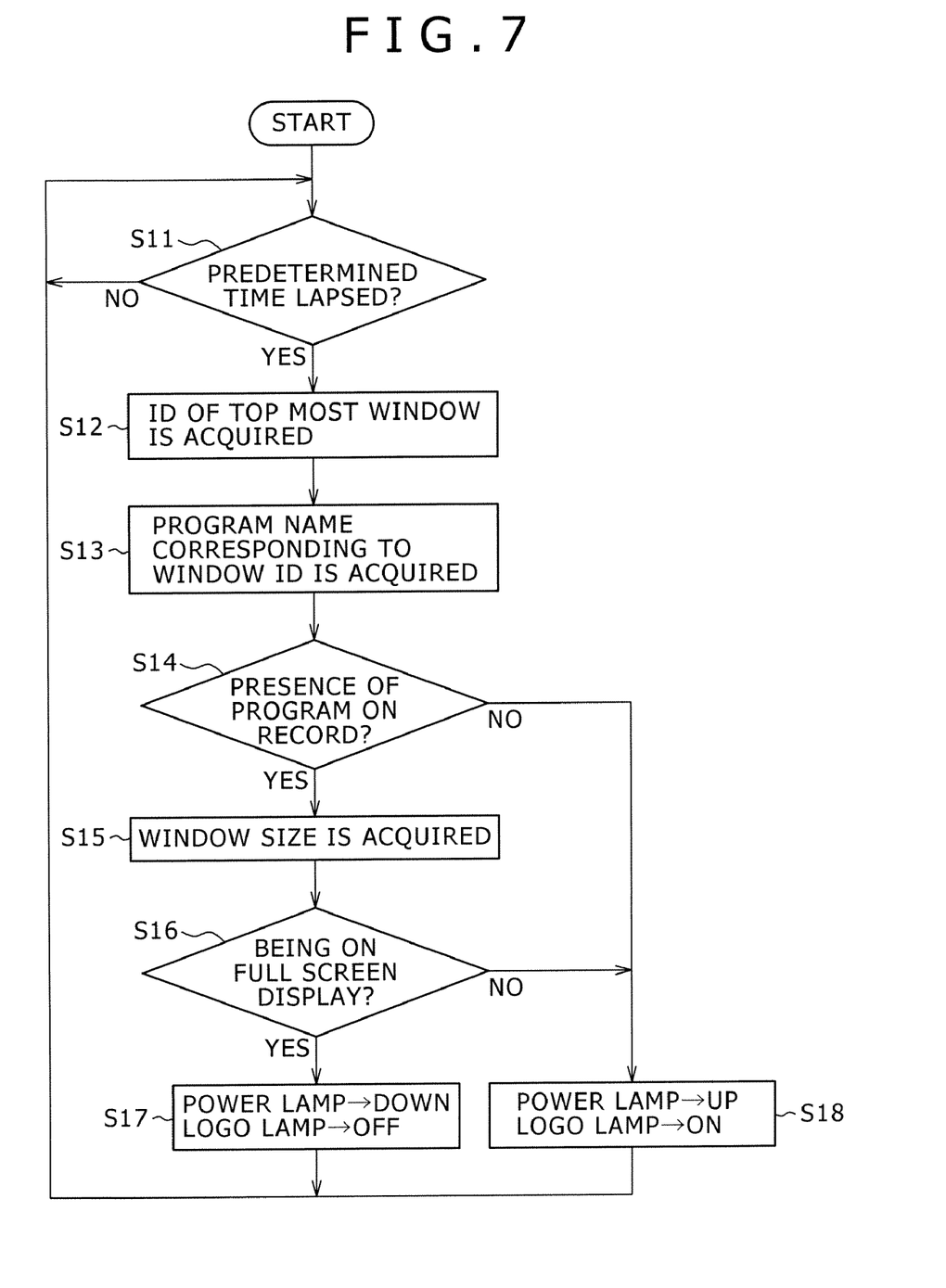
FIG. 7 is a flowchart showing a processing procedure taken for running of an indicating lamp control program.

FIG. 7 is a flowchart showing a processing procedure taken for the running of the indicating lamp control program.

[Step S11] The indicating lamp control processing unit 112 determines whether or not a certain time (1 second, for instance) has lapsed. When the certain time has lapsed, the indicating lamp control processing unit requests the window state detecting unit 111 to follow the processing in a next step S12. This allows a series of processing of the steps from S12 to S18 to be repeated for a certain period of time.

[Step S12] The window state detecting unit 111 requests the window management unit 201 to output the ID of the topmost window on the display, and then acquires the window ID from the window management unit 201.

[Step S13] The window state detecting unit 111 requests the window management unit 201 to output the program name corresponding to the window ID acquired in the step S12. This allows the program name corresponding to the presently topmost window to be acquired from the window management unit 201, followed by outputting the acquired program name to the indicating lamp control processing unit 112.

[Step S14] The indicating lamp control processing unit 112 determines whether or not the program name acquired in the step S13 corresponds to the program name listed as the application for the automatic control of the indicating lamps. In the presence of the corresponding program name, the indicating lamp control processing unit 112 requests the window state detecting unit 111 to follow the processing in a step S15. Conversely, in the absence of the corresponding program name, the processing is moved to a step S18.

[Step S15] The window state detecting unit 111 requests the window management unit 201 to output size information of the window corresponding to the window ID acquired in the step S12, and then outputs, to the indicating lamp control processing unit 112, the window size information received in response to the above request.

[Step S16] The indicating lamp control processing unit 112 determines based on the information acquired in the step S15 whether or not the topmost window is on the full screen display. When the topmost window is on the full screen display, the processing in a step S17 is followed, while in other cases, the processing is moved to the step S18.

[Step S17] The indicating lamp control processing unit 112 requests the BIOS to turn down the LED 6a (or the power lamp) of the power indicating unit 7, and off the LED 7a (or the logo lamp) of the logo indicating unit 7. Afterwards, the processing is returned to the step S11 for monitoring of the time lapsed.

[Step S18] The indicating lamp control processing unit 112 requests the BIOS to turn up the LED 6a (or the power lamp) of the power indicating unit 6, and on the LED 7a (or the logo lamp) of the logo indicating unit 7. Afterwards, the processing is returned to the step S11 for the monitoring of the time lapsed.

The above processing allows the video content display program listed with the indicating lamp control processing unit 112 to run, resulting in the automatic control so as to turn down the power lamp and off the logo lamp when the window corresponding to the running of this program is in the topmost position and on the full screen display. Thus, the situation of the interference caused by the light from the indicating lamps during the display of the video contents is automatically presumed, allowing the comfortable viewing environment to be maintained by automatically avoiding the situation like the above without any user's operation.

The change of the window to any state different from the above requirements causes the control so as to turn up the power lamp and on the logo lamp, so that the restoration of the indicating lamps to the illuminating state may be automatically obtained, leading to a further enhancement of user's availability.

The above processing makes use of the window state management function (or the window management unit 201) usually contained in the information processing apparatus 1 to control the indicating lamps. Thus, relatively simple software processing may be applied to the automatic control of the indicating lamps without any extra special-purpose hardware for detection of the user's position, allowing the comfortable video content viewing environment to be provided for the user without increasing development and/or manufacture costs of the information processing apparatus 1 (or the indicating lamp control program 110).

While the above embodiment is supposed to change the indicating lamp state depending on whether or not the window with the video contents displayed is on the full screen display, it will be appreciated that the indicating lamp state may be also changed depending on whether or not the above window has predetermined vertical and horizontal sizes or more. Specifically, the same effects as the above may be obtained by turning down or off the indicating lamps when a ratio of the number of vertical and horizontal pixels of the window to the total number of vertical and horizontal pixels of the display reaches a predetermined value or more.

Figure 8:
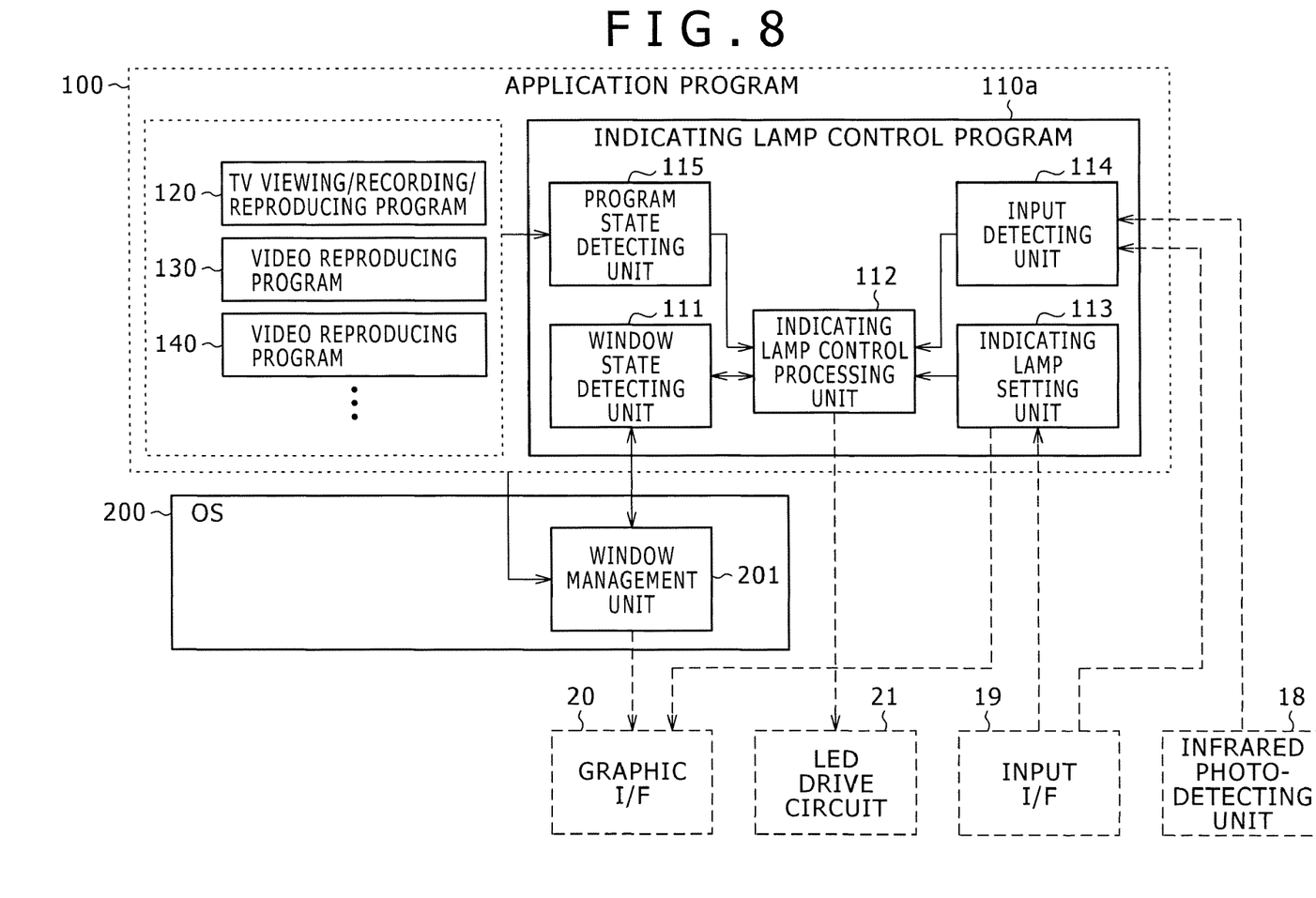
FIG. 8 is a block diagram showing functions of the information processing apparatus according to another embodiment of the present invention.

FIG. 8 is a block diagram showing functions of an information processing apparatus according to a different embodiment of the present invention. It is to be noted that the functions, the programs and the hardware respectively corresponding to the above embodiment are denoted with the same numerals, and their description is omitted.

The information processing apparatus shown in FIG. 8 has an input detecting unit 114 and a program state detecting unit 115, in addition to the window state detecting unit 111, the indicating lamp control processing unit 112, and the indicating lamp setting unit 113, as the functions implemented by running an indicating lamp control program 110*a*.

The input detecting unit 114 detects, based on control information respectively outputted from the infrared photo-detecting unit 18 and the input I/F 19, whether or not the user has done with an input operation through an external remote controller, the keyboard 5 and the mouse 23, followed by outputting a detection result to the indicating lamp control processing unit 112.

The program state detecting unit 115 detects an operating manner obtained by the user's input operation, such as reproducing start, stop, temporary stop and chapter selection of the video contents, while monitoring the running state of the vide content display program (such as the TV viewing/recording-reproducing program 120 and the video reproducing programs 130 and 140), followed by outputting a detection result to the indicating lamp control processing unit 112.

In addition to the indicating lamp control processing depending on the detection result obtained by the window state detecting unit 111 as previously described with reference to FIG. 7, the indicating lamp control processing unit 112 controls the indicating lamps based on the respective detection results obtained by the input detecting unit 114 and the program state detecting unit 115. This allows the presumption whether or not the user takes one's position close to the information processing apparatus to be obtained more surely, leading to the indicating lamp control depending on the result of the presumption.

Various types of control procedures based on the respective detection results obtained by the window state detecting unit 111, the input detecting unit 114 and the program state detecting unit 115 are available as follows. However, any type of the procedures is basically required to satisfy the automatic brightness and on/off control of the indicating lamps such as the power lamp and the logo lamp only when the video content display program listed in advance is in the running state, or when the corresponding window is in the topmost position during the running of the above program.

For instance, the detection of an operation of input to the remote controller causes the indicating lamps to be turned down or off by making a judgment that the user is at the distance from the information processing apparatus. More specifically, in the case of the detection of the operation of input to the remote controller at the time when the window corresponding to the video display program appears or is in the topmost position, the indicating lamps may be turned down or off irrespectively of the size of the topmost window.

The detection of the operation of input to the keyboard 5 or the mouse 23 wire-connected to the information processing apparatus causes the indicating lamps to be forcibly turned up or on by making the judgment that the user takes one's position close to the information processing apparatus. Further, in the case of no detection of the input operation for a certain time or more after the operation of input to the keyboard 5 or the mouse 23, the brightness or on/off control of the indicating lamps may be provided based on the window state and the corresponding program, like the processing in FIG. 7.

It is also allowable to turn down or off the indicating lamps only when the detection result by the window state detecting unit 115 is that the reproducing of the video contents with the video display program is in execution at the time when it is detected that the window corresponding to the video display program is in the topmost position and on the full screen display.

It is also allowable to forcibly turn up or on the indicating lamps when the detection result by the program state detecting unit 115 is that the user has done with any operational input requiring the operation other than the playback start of the video contents, such as the request for stop (or temporarily stop) of the reproducing of the video contents or for selection of other video contents, with the indicating lamps kept dim or off. Further, when the reproducing is resumed afterwards, the indicating lamps may be also turned down or off again.

As described the above, the functions usually contained in the information processing apparatus are also applied to control the indicating lamps based on the detection result of the input or reproducing operation, allowing the comfortable video content viewing environment to be provided for the user without any extra special-purpose hardware.

While the above embodiments employ the remote controller of a type that provides infrared transmission of the signal, it will be appreciated that in use of a remote controller of a type that provides radio communication by a radio signal, for instance, a distance between the remote controller and the information processing apparatus is also detectable based on a field intensity of received radio wave from the remove controller. A low degree of field intensity of the received radio wave from the remote controller may lead to the judgment that the user is at the distance, so that the detection result of the distance like the above may be also applied to the brightness or on/off control of the indicating lamps.

Further, when the keyboard and the mouse are available in a wireless type, the brightness or on/off control of the indicating lamps may be also provided depending on the detection result of the distance between the information processing apparatus and the user, likewise. In this manner, the brightness or on/off control of the indicating lamps may be performed depending on the presence or not of the operation of input to various input devices for operating the information processing apparatus or the types of the input devices, so that the distance between the user and the information processing apparatus is detected more surely, causing the indicating lamp control suited to the distance between the user and the information processing apparatus to be given automatically.

Alternatively, a camera for imaging user's surroundings may be provided around the monitor 2 to obtain the presumption of the distance between the user and the information processing apparatus and/or the user's position based on the result of an analysis of an image signal from the camera, and the presumption result may be applied to the brightness or on/off control of the indicating lamps. When there is given the presumption of the distance between the user and the information processing apparatus, the indicating lamps may be kept bright, for instance, when the user takes one's position within a certain range of the distance from the information processing apparatus even if the window corresponding to the video display program is in the topmost position and on the full screen display. Otherwise, when the user takes one's position outside the certain range of the distance while the window corresponding to the video display program appears or in the topmost position, the indicating lamps may be turned down or off irrespectively of the topmost window size.

Alternatively, the result of the analysis of the image obtained by imaging a predetermined range ahead of the monitor 2 may be applied to detect the presence or not of a figure image (or a user image), in which case, the indicating lamps may be also kept bright in the case of no detection of the figure image from the image obtained as described the above even if the window corresponding to the video display program is in the topmost position and on the full screen display. In this manner, the user's viewing state may be detected more surely by applying the image analysis result as the requirements for the indicating lamp control, allowing the indicating lamp control suited to the user's viewing state to be given automatically.

Alternatively, a detecting device such as a photo diode for detecting the brightness around the monitor 2 may be provided to automatically turn down or off the indicating lamps when there is a poor light around the monitor 2.

Alternatively, when the information processing apparatus has a function for allowing the keyboard 5 to be housed into the casing of the information processing apparatus, a function for detecting whether or not the keyboard 5 is housed in the casing may be provided to automatically turn down or off the indicating lamps by making the judgment that the user is at the distance, when the keyboard is housed.

Alternatively, it is also possible to apply a control algorithm of a type that provides the control of the indicating lamps in preference of other requirements (or the requirements based on the above detection of the input operation, the reproducing operation and the distance etc.) over the requirements for the position and the size of the window as shown in FIG. 7. Specifically, controlling the indicating lamps in combination of the requirements for the position and the size of the window with the other requirements allows the indicating lamp control more suited to the user's viewing state to be given automatically.

While the above embodiments are supposed to turn down the power lamp and off the logo lamp when there is given the judgment that the user is at the distance, it will be appreciated that the control may be also provided to turn off or down both the lamps. Alternatively, the brightness of the indicating lamps may be also controlled stepwise depending on the manner of detection of the viewing environment based on the window state etc.

The indicating lamps to be controlled are not limited to the power lamp and the logo lamp, and various types of indicating lamps disposed around the monitor 2 may be also applied, inclusive of a lamp to indicate an access to the HDD, a lamp to indicate a manner of radio wave reception in a wireless LAN (Local Area Network), a lamp to indicate a residual battery and various types of decorating lamps such as the logo lamp.

While the above embodiments have been described in relation to one application of the present invention to the monitor-integrated PC, the present invention is not limited to the above embodiments, and may be also applied to an apparatus of a type having the monitor separated from the PC body. In this case, the present invention is preferably applied to the control of the indicating lamps disposed on the casing of the monitor.

Criteria for executing the above indicating lamp control may be also applied to image quality control suited to the video contents on the monitor 2. In the case of the information processing apparatus having a function in which a gamma curve is used for conversion of a RGB image signal outputted to the monitor 2 so as to project a clear image during display of the video image, the gamma curve for the video image may be applied at the same time that the control is changed so as to turn off or down the indicating lamps.

The application of the gamma curve for the video image allows the video image to be displayed brightly, for instance, in which case, the user may watch the video image clearly even at the distance from the monitor 2. Thus, the display of the monitor 2 is turned bright at the same time as the control of the indicating lamps, when it is detected according to the above requirements based on the position and the size of the window that the user is at the distance from the monitor 2, allowing the user's availability to be enhanced. Particularly, in the case of the viewing in a dimly lighted environment, a greater merit is given to the user.

When the display of both the video image and a still image is obtained with the same display program, the control may be provided in consideration of the running state of the display program such as to apply the gamma curve for the video image only to the case of the display of the video image, or turn down or off the indicating lamps simultaneously with the display of the video image. The application of the above gamma curve for the video image to the case of the display of the still image may cause a degraded image quality instead. Thus, while monitoring the running state of the display program, the above gamma curve is surely applied only to the case of the display of the video image, allowing a high quality image and an optimum viewing environment to be provided for the user at all times.

It will be appreciated that the processing functions required for the above information processing apparatus may be implemented on the computer by running the program descriptive of the processing contents of the above functions on the computer. The program descriptive of the processing contents may be recorded in a computer-readable recording medium in advance. The computer-readable recording medium includes a magnetic recording device, an optical disk, a magneto-optical recording medium and a semiconductor memory etc.

A portable recording medium such as the optical disk containing the program is on the market for distribution of the program. Further, the program may be stored in the storage device of a server computer, before transfer of the stored program from the server computer to the other computer through the network.

The computer on which the program is to run stores, in its own storage device, the program such as that contained in the portable recording medium or transferred from the server computer. Then, the computer reads the program from its own storage device, followed by performing the processing according to the program. It will be appreciated that the computer may read the program directly from the portable recording medium, followed by performing the processing according to the program. Alternatively, every transfer of the program from the server computer, the computer may also perform the processing sequentially according to the received program.

The present invention contains subject mater related to Japanese Patent Application No. JP2006-108312 filed in the Japanese Patent Office on Apr. 11, 2006, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An indicating lamp control device for controlling an illuminating operation of indicating lamps disposed around a display surface of a display apparatus, comprising:

window information acquiring means for acquiring information representing a foreground-background stacking position of a window with respect to all other windows, and information representing a size of the window generated for an application program displayed on the display surface of the display apparatus;

program determining means for determining whether or not the application program is a content display program adapted for said display apparatus to display the contents; and control means for controlling, based on both of the information acquired by said window information acquiring means and a determination result obtained by said program determining means, a brightness of said indicating lamps to be less than a predetermined level when said window corresponding to said content display program is in a frontmost position of the foreground-background stacking position with respect to all other windows, and is larger than a predetermined size, wherein the indicating lamps provide a luminance different from a luminance provided via the display surface.

2. The indicating lamp control device according to claim 1, wherein said control means controls the brightness of the indicating lamps to be at said predetermined level unless said window corresponding to said content display program is in the frontmost position of the foreground-background stacking position with respect to all other windows, and is larger than the predetermined size.

3. The indicating lamp control device according to claim 1, wherein said control means controls the brightness of the indicating lamps to be less than said predetermined level when said window corresponding to said content display program is in the frontmost position of the foreground-background stacking position with respect to all other windows and is sized to fill an entire area of said display apparatus, and keeping said indicating lamps at the brightness less than said predetermined level.

4. The indicating lamp control device according to claim 1, wherein said control means controls the brightness of the indicating lamps to be off when said window corresponding to said content display program is in the frontmost position of the foreground-background stacking position with respect to all other windows and is larger than the predetermined size, and turning on said indicating lamps in other cases.

5. The indicating lamp control device according to claim 1, wherein said program determining means holds record information containing program identification information for providing identification of one or more content display program, and determines whether said program identification information provided by said control means corresponds to said content display program, when said program identification information is contained in said record information, and wherein said control means provides to said program determining means the program identification information of the application program corresponding to said window determined from the information acquired by said window information acquiring means when a window in the frontmost position of the foreground-background stacking position with respect to all other all windows is larger than the predetermined size, and the control means further controls the brightness of said indicating lamps to be less than said predetermined level when it is determined that said program identification information corresponds to said content display program.

6. The indicating lamp control device according to claim 5, wherein said program determining means adds program identification information to and deletes program identification information from said record information based on a control signal received in response to an operational input by a user.

7. The indicating lamp control device according to claim 1, wherein said control means controls the brightness of said indicating lamps depending on a type of input device for operating an information processing apparatus, when an input to said input device by a user is detected in a state where said window corresponding to said content display window is in the frontmost position of the foreground-background stacking position with respect to all other windows.

8. The indicating lamp control device according to claim 7, wherein said control means controls the brightness of said indicating lamps based on the information acquired by said window information acquiring means and the determination result obtained by said program determining means, when an operational input to said input device is not detected for a certain time after processing of changing the brightness of said indicating lamps in accordance with the detection of the operational input to said input device.

9. The indicating lamp control device according to claim 7, wherein said control means controls the brightness of said indicating lamps to maintain said predetermined level of brightness, when the operational input by the user to said input device wire-connected to said computer is detected, said indicating lamps being kept at the brightness less than said predetermined level.

10. The indicating lamp control device according to claim 7, wherein said control means controls the brightness of said indicating lamps to be less than said predetermined level when said window corresponding to said content display program is larger than the predetermined size when said window corresponding to said content display program is in the frontmost position of the foreground-background stacking position with respect to all other windows, or upon detection of the operational input by the user to said input device wirelessly-connected to said computer.

11. The indicating lamp control device according to claim 1, wherein said control means controls the brightness of said indicating lamps to be at said predetermined level when a request for an operation other than content reproduction start is detected by said content display program through the operational input by the user.

12. The indicating lamp control device according to claim 1, wherein said control means monitors a manner of content reproducing operation with said content display program to control the brightness of said indicating lamps to be less than said predetermined level when said window corresponding to said content display program is in the frontmost position of the foreground-background stacking position with respect to all other windows and is larger than the predetermined size, and the content reproducing operation with said content display window is being executed.

13. The indicating lamp control device according to claim 1, wherein said control means controls the brightness of said indicating lamps to be at said predetermined level of brightness, when a figure image is not detected from an image obtained from an imaging apparatus that images a predetermined range in front of a display panel of said display apparatus even if said window corresponding to said content display program is in the frontmost position of the foreground-background stacking position with respect to all other windows and is larger than the predetermined size.

14. The indicating lamp control device according to claim 1, wherein said control means controls the brightness of said indicating lamps to be at said predetermined level of brightness when there is, based on a result of an analysis of an image obtained from an imaging apparatus for imaging a range in front of a display panel of said display apparatus, a presumption that there is a figure image within a predetermined range of distance from said display apparatus, or when the presence of any figure image in the image obtained by the imaging apparatus is not confirmed, even if said window corresponding to said content display program is in the frontmost position of the foreground-background stacking position with respect to all other windows and is larger than the predetermined size.

15. The indicating lamp control device according to claim 1, wherein said control means controls the brightness of said indicating lamps to be at said predetermined level of brightness irrespective of the size of a window in the frontmost position of the foreground-background stacking position with respect to all other windows, when there is, based on a result of an analysis of an image from an imaging apparatus for imaging a range in front of a display panel of said display apparatus, a presumption that there is a figure image outside a certain range of distance from said display apparatus when said window corresponding to said content display program is in the frontmost position of the foreground-background stacking position with respect to all other windows.

16. The indicating lamp control device according to claim 1, wherein when said computer has an image quality correction function providing suited image quality correction at a time of display of the contents on said display apparatus, said control means outputs a control signal for turning on an operation of said image quality correction function when said window corresponding to said content display program is in the frontmost position of the foreground-background stacking position with respect to all other windows and is larger than the predetermined size, and outputting a control signal for turning off the operation of said image quality correction function in other cases.

17. An information processing apparatus connected to a display apparatus having indicating lamps disposed adjacent to display surface, comprising:
  window state management means for holding information representing a foreground-background stacking position of a window with respect to all other windows, and information representing a size of the window generated for an application program displayed on the display surface of the display apparatus;
  program information holding means for holding program identification information that identifies the application program; and
  control means for controlling, based on the information held by said window state management means and said program information holding means, a brightness of said indicating lamps to be less than a predetermined level when said window corresponding to a content display program adapted for said display apparatus to display the contents is in a frontmost position of the foreground-background stacking position with respect to all other windows, and is larger than a predetermined size, wherein the indicating lamps provide a luminance different from a luminance provided via the display surface.

18. The information processing apparatus according to claim 17, wherein an integral structure with said display apparatus is provided.

19. An indicating lamp control method in an information processing apparatus connected to a display apparatus having indicating lamps disposed adjacent to a display surface, comprising:
  acquiring information representing a foreground-background stacking position of a window with respect to all other windows, and information representing a size of the window generated for an application program displayed on the display surface of the display apparatus;
  determining whether or not the application program is a content display program adapted for said display apparatus to display the contents; and
  controlling, based on the acquired information representing the foreground-background stacking position and the size of the window, and a determination result of whether the display program is adapted for said display apparatus, a brightness of said indicating lamps to be less than a predetermined level when said window corresponding to said content display program is in a frontmost position of the foreground-background stacking position with respect to all other windows, and is larger than a predetermined size, wherein the indicating lamps provide a luminance different from a luminance provided via the display surface.

20. A non-transitory computer-readable medium encoded with computer executable instructions for controlling an illuminating operation of indicating lamps, wherein the instructions, when executed by a processor, cause the processor to execute a method comprising:
  acquiring information representing a foreground-background stacking position of a window with respect to all other windows, and information representing a size of the window generated for an application program displayed on a display surface of a display apparatus;
  determining whether or not the application program is a content display program adapted for said display apparatus to display the contents; and
  controlling, based on the acquired information representing the foreground-background stacking position and the size of the window, and a determination result of whether the display program is adapted for said display apparatus, a brightness of said indicating lamps to be less than a predetermined level when said window corresponding to said content display program is in a frontmost position of the foreground-background stacking position with respect to all other windows, and is larger than a predetermined size, wherein the indicating lamps provide a luminance different from a luminance provided via the display surface.

21. An indicating lamp control apparatus for controlling an illuminating operation of indicating lamps disposed around a display surface of a display apparatus, comprising:
  a window information acquiring unit configured to acquire information representing a foreground-background stacking position of a window with respect to all other windows, and information representing a size of the window generated for an application program displayed on the display surface of the display apparatus;
  a program determining unit configured to determine whether or not the application program is a content display program adapted for said display apparatus to display the contents; and
  a control unit, including a processor, configured to control, based on both of the information acquired by said window information acquiring unit and a determination result obtained by said program determining unit, a brightness of said indicating lamps to be less than a predetermined level when said window corresponding to said content display program is in a frontmost position of the foreground-background stacking position with respect to all other windows, and is larger than a predetermined size, wherein the indicating lamps provide a luminance different from a luminance provided via the display surface.

* * * * *